Feb. 15, 1944.　　J. JANDASEK　　2,341,921
TURBOTRANSMISSION
Filed May 4, 1940　　3 Sheets-Sheet 3
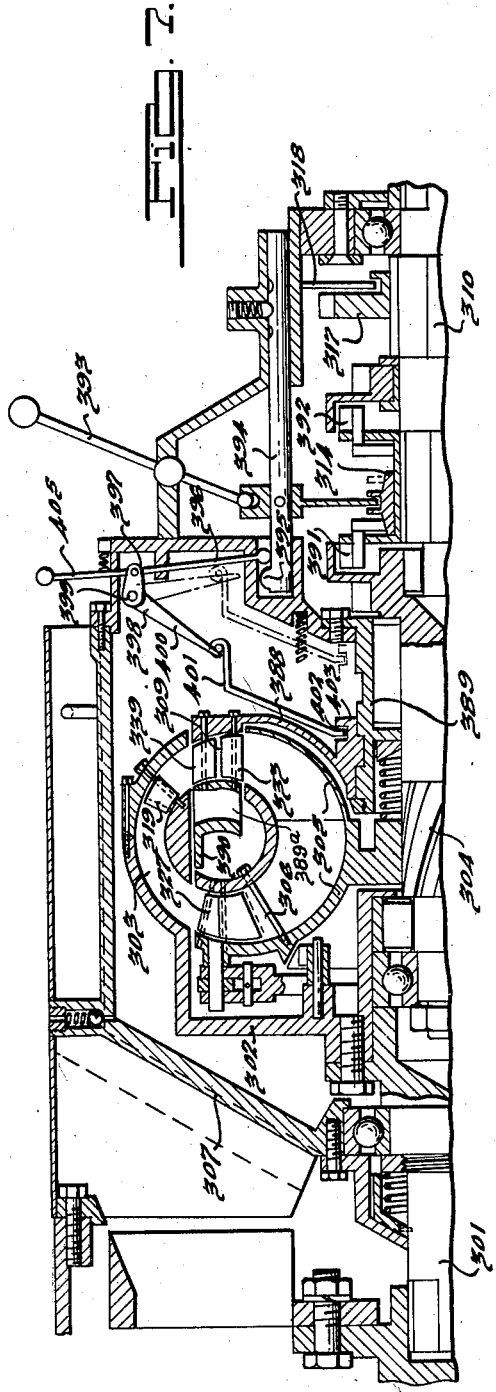
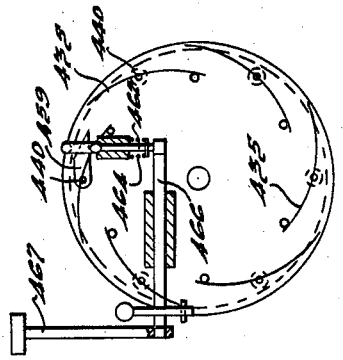
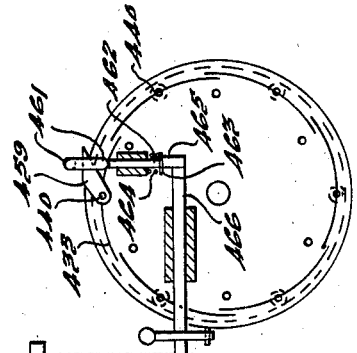
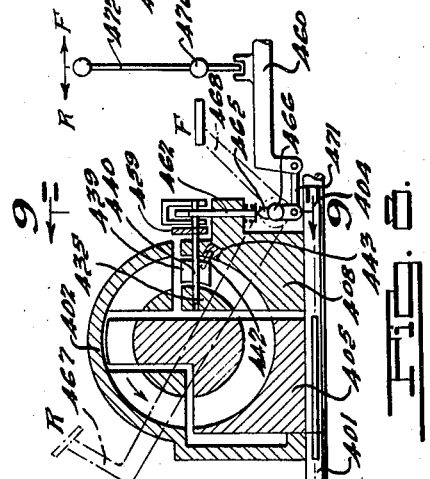
INVENTOR
*Joseph Jandasek.*
BY *Dike, Calver & Gray.*
ATTORNEYS Patented Feb. 15, 1944

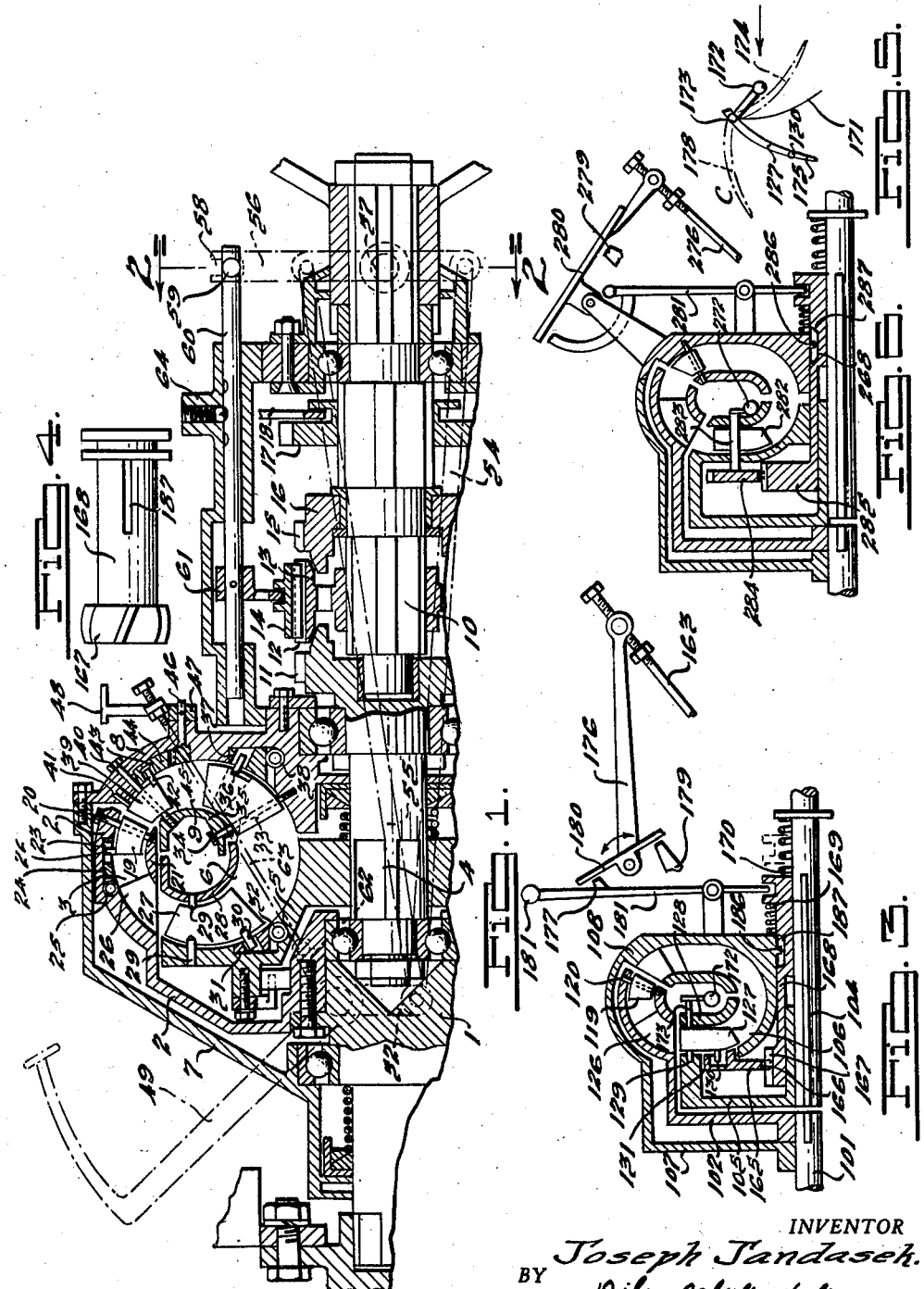

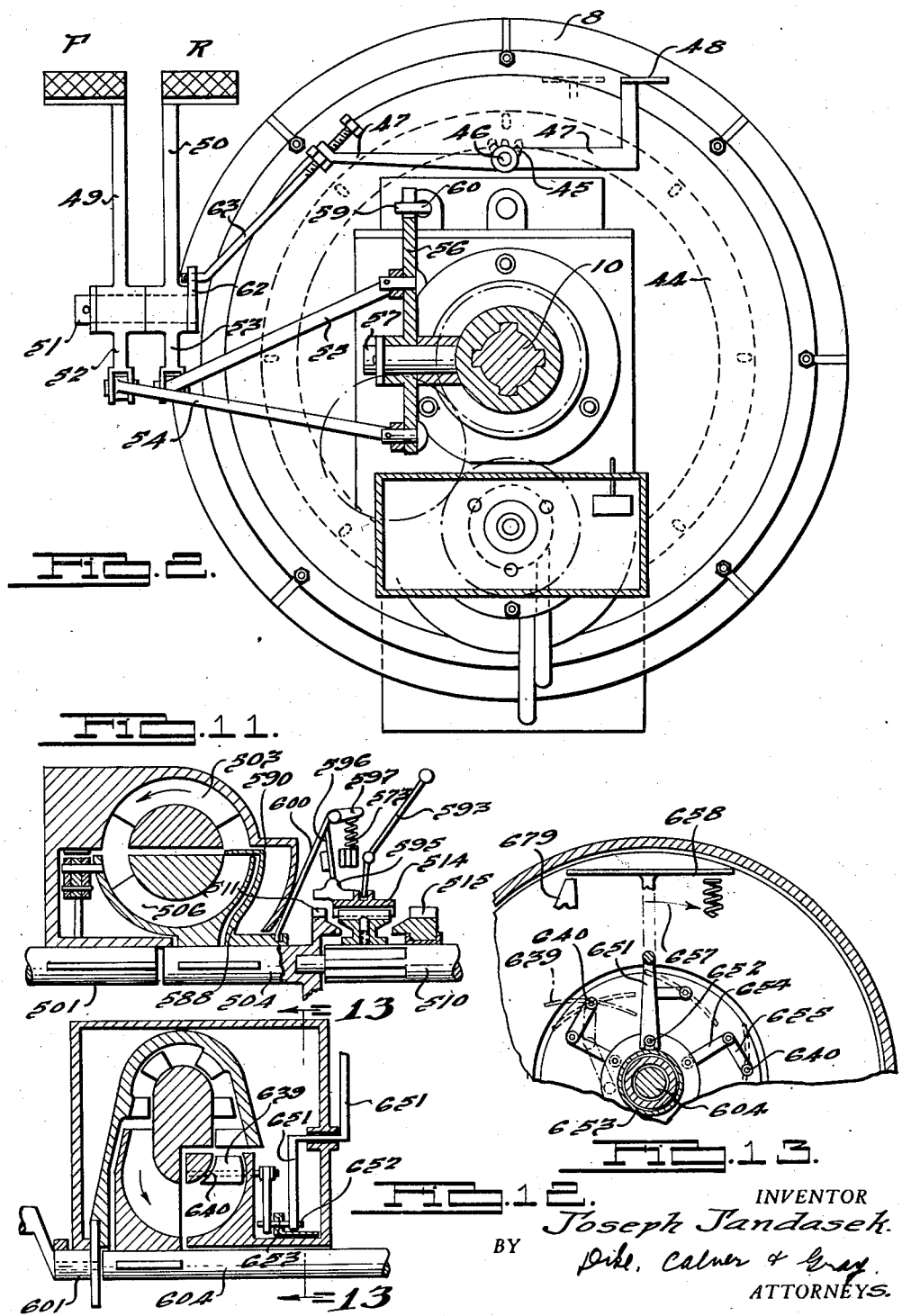

2,341,921

UNITED STATES PATENT OFFICE 2,341,921

TURBO TRANSMISSION

Joseph Jandasek, Detroit, Mich., assignor to Bendix Aviation Corporation, South Bend, Ind., a corporation of Delaware Application May 4, 1940, Serial No. 333,360

15 Claims. (Cl. 74—189.5)

This invention relates to transmissions and more particularly to a novel and improved turbo and mechanical transmission wherein means are provided to selectively control the turbo and mechanical transmissions to transmit power in a more desirable manner than has heretofore been possible.

An object of this invention is to provide a turbo transmission wherein means are provided to simultaneously render the turbo transmission inoperative at the time the mechanical transmission is shifted to vary the speed ratios of the driving and driven shafts.

Another object of the invention is to provide manually operable means to close the fluid circuit of a turbo transmission to enable a mechanical transmission to be actuated to vary the speed ratios of its driving and driven shafts.

A further object of the invention is to provide means for controlling the power transmitted through a transmission in such a manner that the transmission may be shifted into reverse so that the power of the engine may be employed as a brake.

A still further object is to provide means for simultaneously rendering a turbo transmission inoperative and shifting a mechanical transmission to transmit power at varying speeds, and thereafter rendering the turbo unit operative when the mechanical transmission has been shifted to the desired speed ratio whereupon power may be transmitted through the turbo and mechanical transmissions in a desired speed ratio.

Another object of the invention resides in the provision of means for automatically reversing the direction of power transmitted through a turbo unit upon actuation of a brake pedal whereupon the power of the engine may be employed as a vehicle brake.

A more specific object of the invention is to provide means for actuating angularly movable vanes to selectively close the fluid circuit of a turbo unit to permit shifting of a mechanical transmission to vary the speed ratio of power transmitted.

A further object is to provide means for closing a fluid channel of a turbo unit by means of a movable baffle member operably connected to be actuated to close said channel simultaneously upon movement of a shifting mechanism to vary the speed of power transmitted through a mechanical transmission, and to actuate the baffle to render the turbo unit operative when the mechanical transmission has been moved to the desired speed ratio.

A still further object is to provide means for automatically releasing an engine controlling throttle simultaneously with movement of manually operable means to shift a mechanical transmission to vary the speed ratio, accompanied by a simultaneous interruption of the operation of a turbo unit.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a combined turbo and mechanical transmission embodying the present invention.

Fig. 2 is a sectional view taken substantially on the line 2—2 of Fig. 1 looking in the direction of the arrows.

Fig. 3 is a vertical sectional view disclosing a modified form of the invention.

Fig. 4 is a side elevation of a helical cam controlling mechanism for the vanes disclosed in Fig. 3.

Fig. 5 is a diagrammatic view illustrating the angularly movable vanes of Fig. 3 in three different positions.

Fig. 6 is a vertical sectional view showing a further modified form of the invention.

Fig. 7 is a view similar to Fig. 1 showing a modified form of control mechanism.

Fig. 8 is a vertical sectional view taken substantially on the line 8—9 of Fig. 7.

Fig. 9 is a diagrammatic view similar to Fig. 8 illustrating the operation of the vane control mechanism of Fig. 8.

Fig. 10 is a view similar to Fig. 9 showing the vanes in open position.

Fig. 11 is a vertical sectional view of a turbo clutch embodying the present invention.

Fig. 12 is a vertical section showing a still further modified form of the invention; and Fig. 13 is a sectional view taken substantially on the line 13—13 of Fig. 12 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the embodiment of the invention illustrated in Fig. 1, a driving shaft 1 which may be driven by any suitable source of power such for example as the engine of a motor vehicle is provided with an impeller web 2 having an impeller channel 3 through which fluid may circulate. A primary driven shaft 4 is preferably coaxially aligned with the driving shaft 1 and is provided with a turbine web 5 having a turbine channel 6 disposed in alignment with the impeller channel 3. A stationary housing 7 may be coaxially aligned with a portion of the driving shaft 1 and support a reaction member web 8. The web 8 is provided with a reaction chamber 9 preferably interposed between the impeller and turbine channels 3 and 6 respectively.

A second or auxiliary driven shaft 10 of a mechanical transmission is preferably coaxially aligned with the driven shaft 4 of the turbo transmission which operates as a driving shaft to transmit power to the driven shaft 10. The shaft 4 is provided with a pinion gear and clutch member 11 coaxially aligned with the clutch member 12 carried by a sleeve 13 mounted on the driven shaft 10.

Coupling means, such for example as an axially shiftable barrel 14 may be provided to bridge the clutch members 11 and 12 to directly interconnect the shafts 4 and 10 to transmit power at a 1:1 speed ratio. A pinion gear and clutch member 15 preferably of the same diameter as the clutch member 11 is carried by a ring 16 freely rotatable relative to the driven shaft 10. The clutch member 11 carried by the shaft 4 is operably connected to drive a countershaft preferably operably connected to the pinion gear 15 through an idler gear to rotate the pinion 15 with the countershaft in the opposite direction. The barrel 14 may be shifted axially to bridge the pinion gear 12 operably connected to the driven shaft 10 and the pinion 15 driven through the countershaft mechanism to drive the driven shaft 10 in the opposite direction to the shaft 4. A low speed gear 17 is splined to the shaft 4. A low speed gear 17 is splined to the driven shaft 10 and may be shifted axially by means of a shifter fork 18 into mesh with a countershaft gear to drive the driven shaft 10 in the same direction with the shaft 4 at reduced speed.

The impeller channel 3 is provided with a plurality of angularly movable blades 19 carried by shafts 20 extending from the impeller web 2 into an impeller shroud 21. The trailing edge of the blades 19 are provided with projections 22 which extend into a plurality of spaced slots 23 formed in an annular ring 24 mounted in the impeller web 2. Yielding means, such for example as springs 25, may be provided to urge the annular ring 24 to yieldingly urge the blades 19 toward a substantially predetermined angular position in opposition to the fluid reaction exerted by the fluid circulating in the impeller channel 3. A plurality of fixed impeller blades 26 are interposed between the impeller web 2 and the impeller shroud 21 to guide the fluid issuing from the impeller channel 3.

The turbine channel 6 is provided with a plurality of angularly movable vanes 27 hingedly connected to the turbine web 5 and a turbine shroud 28 by means of pins 29. The angular movement of the vanes 27 is controlled by projections 30 carried by the vanes 27 and extending into slots formed in a ring 31 axially movable in the turbine web 5 and yieldingly urged to position the vanes 27 in a substantially predetermined angular relation by means of springs 32 in opposition to fluid reaction.

The channel 9 of the reaction member is provided with a plurality of spaced vanes 33 pivotally mounted on shafts 34 projecting from the reaction member web 8 into a reaction shroud member 35. The angular position of the vanes 33 is controlled in a manner similar to that of the impeller and turbine vanes by projections 36, ring 37 and springs 38.

The reaction member is also provided with a plurality of angularly movable gates 39 carried by shafts 40 extending from the web member 8 into the reaction shroud member 35. Projections 41 carried by the web 8 project into the channel 9 to limit the angular movement of the gates 39 in one direction.

Means are provided to vary the angular relation of the gates 39. One desirable form of gate control means comprises pins 42 carried by the gates 39 and projecting into slots 43 formed in a ring gear 44. The ring gear 44 may be actuated by means of a pinion 45 (see also Fig. 2) to move the gates 39 from the closed position to the open position defined by the stop members 41. The pinion 45 is preferably mounted on a shaft 46 operably connected to a lever 47. Manually operable means 48 are provided to actuate the shaft 46 to control the angularly movable gates 39 if desired.

Manually operable means such for example as the foot pedals 49 and 50 may be provided to actuate the shaft 46 to control the angular position of the gates 39 and to actuate the axially shiftable barrel 14 to selectively interconnect the shaft 4 with the driven shaft 10 to rotate the driven shaft 10 in either forward or reverse directions. The shafts 49 and 50 are pivotally mounted on a stud 51 and are connected through levers 52 and 53 respectively with rods 54 and 55 with a double acting lever 56 pivotally mounted on a stud 57. The upper end of the lever 56 is bifurcated as illustrated at 58 to receive a pin 59 operably connected to a rod 60. The rod 60 is provided with a finger member 61 which engages the axially shiftable barrel 14 of the synchronizer mechanism to selectively interconnect the sleeve 13 with the pinion gears 11 or 15 to drive the driven shaft 10 in the same direction as the shaft 4 or in the reverse direction.

The link 50 is provided with an arm 62 operably connected by means of a link 63 to the lever 47 fixed to the shaft 46 to actuate the pinion 45 to control the angular position of the gates 39.

In the operation of this device when it is desired to rotate the driven shaft in the same direction as the driven shaft 10 and the shaft 4, the pedal 49 is actuated whereupon motion is transmitted through the lever 52, rod 55, lever 56, rod 60 and finger member 61 to move the barrel 14 axially to bridge the pinion gears 11 and 12 thereby operably interconnecting the shaft 4 with the driven shaft 10 to drive it in the same direction as the shaft 4 at the same speed. The synchronizing mechanism associated with the pinion gears 11 and 12 becomes operative upon axial movement of the barrel 14 to synchronize the speeds of the gears 11 and 12 whereupon the barrel 14 may slide over the gear 11 to interconnect it with the gear 12 without clashing of the gears.

In view of the angular relations of the arm 62 and the link 63 any movement of the levers 49 and 50 will actuate the lever 47 to rotate the ring gear 44 to move the gates 39 from the closed position to the open position. Any suitable means such for example as that illustrated at 64 may be provided to hold the levers 49 or 50 in the depressed position to hold the gates 39 in the open position and to maintain the barrel in operative relation relative to the gears which it is desired to interconnect.

When it is desired to rotate the driven shaft 10 in the reverse direction relative to the shaft 4, to use the power of the engine as a brake or to drive the driven shaft 10 in reverse, the pedal 50 may be depressed whereupon the rod 55 will oscillate the lever 56 about the stud 57, elevating the pedal 49 and moving the rod 60 and finger member 61 to shift the barrel 14 out of engagement with the gear 11 toward the neutral position shown. Simultaneously with this movement the arm and link 62 and 63 respectively actuate the lever 47 and shaft 46 to close the gates 39 thereby closing the reaction channel 9 to render the turbo unit inoperative. Further depression of the pedal 50 will move the barrel 14 into bridging engagement with the gears 12 and 15 thereby interconnecting the driven shaft 10 and the shaft 4 to rotate the shaft 10 through the reverse countershaft gear mechanism in the reverse direction.

Initial movement of the barrel 14 toward the gear 15 actuates the synchronizing mechanism to rotate the gears 12 and 15 at the same peripheral speed prior to engagement of the gear teeth of the barrel 14 with the teeth of the gear 15. When synchronization is complete and the lever 50 is depressed further to shift the barrel 14 into engagement with the gear 15, the arm 62 and link 63 move out of alignment and actuate the lever 47 and shaft 46 to open the gates 39 in the reaction member channel 9 whereupon the turbo unit may transmit power as a torque converter or turbo clutch.

Fig. 3 shows an embodiment of the invention which is similar in certain respects to that of Figs. 1 and 2, and corresponding parts have therefore been given corresponding reference numerals with the addition of 100.

In this embodiment the vanes 127 positioned in the turbine channel 106 may be actuated to close the fluid circuit to render the turbo unit inoperative to permit the synchronizing device to bring the driving and driven shafts to the same speed so that the shafts may be operably interconnected to selectively transmit power in forward or reverse direction. The turbine vanes 127 mounted on the projections 129 carried by the turbine web 105 and the turbine shroud 128 may be actuated by means of the projections 130 extending into the slots formed in the ring 131. The ring 131 may be formed with a flange 165 having helical teeth 166 adapted to mesh with an elongated helical gear 167, see also Fig. 4. The helical gear 167 is preferably carried by an axially shiftable cylinder 168 mounted on the driven shaft 104.

Means such for example as a pin 186 carried by the reaction web 108 and projecting into a slot 187 formed in the cylinder 168 may be provided to hold the cylinder 168 from turning relative to the reaction member 108, yet permitting it to move axially relative thereto. Yielding means, such for example as springs 169 and 170, may be provided to urge the cylinder 168 to yieldingly position the vanes 127 toward a substantially predetermined angular position illustrated by the position 171 of Fig. 5. At high speeds and light loads the counterweight 172 operably connected through the shaft 173 to the vanes 127 urges the vanes 127 toward the position illustrated at 174. When the device is operating at slow speeds and heavy loads the pressure of the fluid circulating urges the vanes 127 to the position illustrated at 175 of Fig. 5.

Upon actuation of the manually operable means to shift the mechanical unit illustrated in Fig. 1 to transmit power to the driven shaft 10 in either direct drive or reverse direction, the link 163 operates through the linkage 176 and 177 to shift the cylinder 168 axially to the dotted line position of Fig. 3 whereupon the vanes 127 are moved to the closed position illustrated at 178 of Fig. 5 whereupon the synchronizing device becomes effective to rotate the gears at the same speed prior to the time when they become mechanically interconnected. It will be observed that if the manually operable means is actuated to close the fluid circuit and vary the speed ratio between the driving and driven shafts, the accelerator pedal 179 is released by the lever 180 operably connected to the linkage 176. If desired, auxiliary manually operable means 181 may be provided to close the fluid circuit of the turbo unit.

The embodiment of Fig. 6 is generally similar to that of Fig. 3 and corresponding parts have therefore been given corresponding reference numerals with the addition of 100.

In this embodiment of the invention it will be observed that the turbine vanes 282 may be fixed to shafts 283 having the counterweight 272 at one end and pinion gears 284 at the other end. The pinion gears 284 mesh with a helical spur gear 285 carried by the cylinder 268. The operation of this embodiment is generally similar to that discussed above.

The embodiment of the invention illustrated in Fig. 7 is similar in many respects to that illustrated in Fig. 1 and corresponding parts have therefore been given corresponding reference numerals with the addition of 300.

It will be observed that in this embodiment of the inventition a reaction web 388 is axially movable on a helical sleeve 389 carried by the turbo driven shaft 304. The reaction web member 388 is formed with a channel 309 adapted to be interposed between the impeller and turbine channels when the device is operating as a torque converter. The channel 309 is provided with entrance and discharge angularly movable vanes 333 and 339 respectively. The reaction web member 388 also carries a free channel 389a which may be shifted into alignment with the impeller and turbine channels by axial movement of the web member 388 under the influence of fluid reaction or manually when it is desired to operate the device as a turbo clutch.

The reaction web member 388 also carries a sleeve 390 which may be shifted axially to close the passage between the impeller and turbine channels when it is desired to render the device inoperative to facilitate shifting of the axially movable barrel 314 to interconnect the driven shaft 310 with the shaft 304 to rotate the shaft 310 in the same direction or in reverse.

The driven shaft 310 is preferably coaxially aligned with the shaft 304 and may be interconnected therewith to rotate at the same speed and in the same direction by means of a friction clutch 391, or may be interconnected by means of a countershaft and reverse gear mechanism by means of a friction clutch 392 to rotate in the opposite direction relative to the shaft 304.

Manually operable means, such for example as the lever 393 operably connected to the barrel 314 through a shifting rod 394, may be provided to selectively interconnect the driven shaft 310 with the shaft 304 to rotate said shaft in the same or in the opposite directions. The shifter rod 394 is provided with a cam member 395 adapted to engage and lift a link 396 when the lever 393 is moved to position the axially shiftable barrel 314 in the neutral position. The link 396 is positioned to engage an arm 397 of a bell crank 398 pivotally mounted on a shaft 399. The other arm 400 of the bell crank 398 engages a member 301 operably connected through a groove 402 with the hub 403 of the reaction web member 388 to shift the reaction web 388 axially to align the sleeve 390 with the impeller and turbine channels 303 and 306 to close the fluid circuit whereupon the barrel 314 may readily be actuated to interconnect the shaft 304 with the driven shaft 310 through either of the friction clutches 391 or 392. During this movement of the device the arm 400 of the bell crank 398 and the member 401 move to the dotted line position.

If desired, separate manually operable means 405 may be provided to selectively transform the unit from a torque converter to a turbo clutch wherein the channel 389a is interposed between the impeller and turbine channels 303 and 306, or to position the sleeve 390 across the impeller and turbine channels to render the device inoperative. The free channel 389a may be eliminated and the sleeve 390 may be carried directly by the reaction shroud member, if desired.

The embodiment of Figs. 8 to 10 is similar in many respects to that of Fig. 1, and corresponding parts have therefore been given corresponding reference numerals with the addition of 400.

It will be observed that in this embodiment of the invention the gates 439 of the reaction member are fixed to spaced shafts 440. One of the shafts 440 is provided with a lever 459 the end of which projects through a pair of spaced members 461 carried by an actuating rod 462. The rod 462 is provided with a collar 463 and a spring 464 to yieldingly urge the rod 462 to move the vanes 435 toward the open position as illustrated in Fig. 10. The collar 463 and rod 462 may be actuated by means of a cam 465 carried by a rod 466 having a manually operable reverse pedal 467 fixed thereto. The shaft 466 is also provided with a manually operable pedal 468 to operate the device in forward direction.

Means such for example as an axially shiftable rod 460 are provided to actuate a mechanical transmission of the type illustrated in Fig. 1 to selectively shift the mechanical transmission into either forward or reverse direction. A link 471 interposed between the shaft 466 and the rod 460 is provided to close the gates 439 to interrupt the operation of the turbo unit when a mechanical transmission of the general type illustrated in Fig. 1 is in the neutral position. When either the reverse pedal 467 or the forward pedal 468 is actuated to shift the mechanical transmission unit into reverse or forward, the cam 465 associated with the end of the rod 462 permits the rod 462 to be actuated by the spring 464 whereupon one of the members 461 engages the lever 459 to move the gates 435 to the open position as illustrated in Fig. 10.

If desired, separate manually operable means such as the rod 475 pivoted at 476 may be provided to actuate the rod 460 to shift the mechanical transmission and to simultaneously actuate the gates 439 of the turbo unit.

Fig. 11 discloses a turbo clutch embodying my invention. Many of the features disclosed in Fig. 11 are similar to those discussed in connection with Fig. 7, and corresponding parts have therefore been given corresponding reference numerals with the addition of 200.

In the operation of this device when a manually operable member such as the lever 593 is in the neutral position disclosed, the projection 595 associated with the axially shiftable barrel 514 urges a rod 596 upwardly whereupon the member 600 is actuated to shift the web 588 carrying the sleeve 590 axially relative to the shaft 504 to position the sleeve 590 between the impeller and turbine channels 503 and 506 respectively to interrupt the operation of the turbo clutch.

When the lever 593 is shifted further in one direction the axially movable barrel 514 will engage the pinion 511 to interconnect the shaft 504 and the driven shaft 510 to rotate it in the same direction at the same speed. When the lever 593 is shifted further in the opposite direction, the barrel 514 will engage the pinion 515 to rotate the driven shaft 510 through the countershaft reverse mechanism in the reverse direction. Prior to engagement of the shiftable barrel 514 with the pinions 511 or 515, the synchronizing mechanism associated with the barrel 514 will rotate the barrel and the desired pinion at substantially the same speed. When the barrel 514 is shifted from the neutral position the rod 596 is released by the projection 595 whereupon the spring 573 yieldingly urges the member 600 and the associated parts to withdraw the sleeve 590 from the space between the impeller and turbine channels 503 and 506 respectively. The operation of the device as a turbo clutch is then resumed, and power is transmitted to the driven shaft 510 at the desired speed ratio and in the desired direction of rotation.

Figs. 12 and 13 disclose a modified form of the invention wherein the turbo circuit is closed when it is desired to shift a mechanical transmission to vary the speed or direction of rotation of a driven shaft relative to a driving shaft. In this embodiment of the invention the reaction gates 639 are closed by means of a linkage comprising a lever 651 having a forked end position to straddle a shaft 652. The shaft 652 is carried by a sleeve 653 rotatably mounted on the shaft 604. The sleeve 653 is operably connected to each of the vanes 639 by means of links 654 pivotally connected to levers 655 fixed to shafts 640 to which the vanes 639 are fixed.

When the lever 651 is actuated in the direction of the arrow 657 of Fig. 13 by means of the manually operable member 658, the accelerator pedal 679 is released to interrupt the flow of power from the prime mover, and the gates 639 are closed by means of the linkage 651, 653, 654 and 655. When the mechanical transmission has been moved to effect drive of the driven shaft at the desired speed ratio and in the desired direction of rotation, the member 658 is actuated in the reverse direction whereupon the linkage interposed between the member 651 and the gates 639 moves the gates to the open position and the device operates as a torque converter.

It is to be understood that various features disclosed in the different embodiments of my invention may be combined with each other without departing from the spirit of my invention.

This is a continuation in-part of my copending applications Serial No. 7,896, now Patent No. 2,205,794, issued June 25, 1940; Serial No. 588,163, now Patent No. 2,222,618, issued November 26, 1940; and Serial No. 547,256, now Patent No. 2,271,919, issued February 3, 1942.

I claim:

1. A transmission device comprising a driving shaft, a driven shaft, a turbo unit having impeller and turbine wheels fixed to the driving and driven shafts, an auxiliary shaft adapted to be connected to the driven shaft, shifting mechanism to vary the speed ratio and direction of rotation between the driven and auxiliary shafts, and means operated by movement of the shifting mechanism to interrupt the operation of the turbo unit during said shifting operation.

2. In a combined turbo and variable speed mechanical transmission having driving and driven shafts, mechanism to operate said variable speed transmission, and means operated by an initial movement of said mechanism to interrupt the operation of the turbo unit during operation of the variable speed transmission.

3. In a combined turbo and variable speed mechanical transmission for a throttle controlled vehicle, driving and driven shafts, impeller and turbine members associated with the driving and driven shafts and forming a power transmitting fluid circuit, angularly movable members to interrupt the fluid circuit, mechanism to actuate the variable speed transmission, and means operated by an initial movement of said mechanism to release the throttle and actuate said angularly movable members to interrupt the operation of the turbo unit during actuation of said mechanism.

4. A transmission device comprising a driving shaft, primary and secondary driven shafts, an impeller wheel having a fluid channel carried by the driving shaft, a turbine wheel having a fluid channel carried by the primary driven shaft, speed ratio varying means between the primary and secondary driven shafts, manually operable means to actuate the speed ratio varying means, angularly movable vanes positioned in the channel of one of said wheels and movable between a substantially closed position and an open operating position, and means operated by movement of said manually operable means to substantially close said vanes when the manually operable means is actuated to operate the speed ratio varying means.

5. In a transmission device, a driving shaft, a fluid energizing impeller carried by the driving shaft, a driven shaft, an energy absorbing turbine carried by the driven shaft, a reaction member associated with the impeller and turbine, angularly movable gates carried by the reaction member and movable from a substantially closed to an open position, a final driven shaft, speed ratio varying means including a neutral or inoperative position interposed between said driven and final driven shafts, manually operable means to shift the speed ratio varying means and means operated by movement of the speed ratio varying means towards said neutral position to substantially close said gates and to open said gates as the speed ratio varying means is moved from said neutral position.

6. A transmission device comprising driving and driven shafts, impeller and turbine elements associated with the driving and driven shafts, a reaction member, said impeller reaction and turbine members forming a circuit through which fluid may circulate to transmit power, a final driven shaft, forward and reverse coupling means interposed between the driven and final driven shafts, means having a neutral position and two selectively settable positions to interconnect the driven and final driven shafts to rotate the final driven shaft in the same direction or in reverse directions, and means operated by movement of said means from either settable position toward the neutral position to substantially interrupt the fluid circuit to materially reduce the transmission of power and to open said circuit when said member passes beyond the neutral position to either of said settable positions.

7. A transmission device for a throttle controlled vehicle comprising driving and driven shafts, impeller and turbine elements associated with the driving and driven shafts, a reaction member, said impeller reaction and turbine members forming a circuit through which fluid may circulate to transmit power, angularly movable gates in the circuit, a final driven shaft, forward and reverse coupling means interposed between the driven and final driven shafts, means having a neutral position and two selectively settable positions to interconnect the driven and final driven shafts to rotate the final driven shaft in the same direction or in reverse directions, and means operated by movement of said means from either settable position toward the neutral position to urge the throttle towards the closed position and to move said gates angularly to substantially interrupt the fluid circuit to materially reduce the transmission of power and to open said circuit when said member passes beyond the neutral position to either of said settable positions.

8. In a fluid and mechanical transmission, driving and driven shafts, impeller and turbine wheels fixed to the driving and driven shafts and forming a circuit through which fluid may circulate to transmit power, angularly movable gates in the circuit, speed ratio varying means having a neutral and a plurality of settable positions associated with the driven shaft, and means operated by movement of the speed ratio varying means from any of said settable positions toward the neutral position to actuate said gates to substantially interrupt the transmission of power through the fluid circuit until the speed ratio varying means approaches one of said settable positions.

9. In a fluid and mechanical transmission for a throttle controlled vehicle, driving and driven shafts, impeller and turbine wheels carried by the driving and driven shafts and forming a circuit through which fluid may circulate to transmit power, angularly movable fluid deflecting vanes in the circuit, speed ratio varying means having a neutral and a plurality of settable positions associated with the driven shaft, means operated by movement of the speed ratio varying means from any of said settable positions toward the neutral position to move the vanes angularly to substantially interrupt the transmission of power through the fluid circuit until the speed ratio varying means approaches one of said settable positions, and means operated by movement of the speed ratio varying means toward the neutral position to urge the throttle toward the closed position.

10. A transmission device comprising driving and driven shafts, impeller and turbine means associated with the driving and driven shafts, a member carried by the impeller and turbine elements and movable selectively from an open position wherein power may be transmitted through the impeller and turbine elements as a turbo clutch to a position to substantially close the fluid circuit thereby materially interrupting the circulation of fluid to decrease the power transmitted or to interpose a reaction member between the impeller and turbine elements whereby the device may transmit power as a torque converter, speed ratio varying means associated with the driven shaft, shiftable means controlling the speed ratio varying means and movable from a neutral position to a plurality of selectively settable positions, and means interconnecting said member and manually operable means to move said member to substantially close the fluid circuit when the shiftable means is moved toward the neutral position and to open said circuit to operate the device as a turbo clutch or as a torque converter when said shiftable element is moved from the neutral position toward either of said selectively settable positions.

11. A turbo clutch comprising driving and driven shafts, impeller and turbine wheels fixed to the driving and driven shafts and positioned to form a circuit through which fluid may circulate to transmit power, means to selectively substantially close or open said circuit, speed ratio varying means associated with the driven shaft, manually operable means movable from a neutral to a settable position, and means operated by movement of the speed ratio varying means toward the neutral position to substantially close the fluid circuit and to open said circuit as the manually operable means is moved to said settable position.

12. In a device of the class described, driving and driven shafts, impeller and turbine wheels carried by the driving and driven shafts and forming a circuit through which fluid may circulate to transmit power, a reaction member associated with the impeller and turbine, angularly movable gates positioned in the reaction member to move from a substantially closed to an open position, speed ratio varying means associated with the driven shaft, manually operable means movable from a neutral to a plurality of settable positions to control the speed ratio varying means, and means operated by movement of said manually operable means from any of said settable positions towards the neutral position to substantially close said gates while the speed ratio varying means is being actuated and to open said gates as the manually operable means approaches any of said settable positions.

13. In a transmission device, driving and driven shafts, impeller and turbine wheels fixed to the driving and driven shafts and forming a channel for the circulation of power transmitting fluid, a plurality of vanes carried by one of said wheels and movable angularly from an open position to a position to substantially close said channel, means including a lever to move said vanes angularly, speed ratio varying driving means associated with the driven shaft, manually operable means having a neutral and a plurality of settable positions controlling the speed ratio varying driving means, and means operated by movement of the manually operable means towards the neutral position to actuate said lever to substantially close said channel and to actuate said lever to open said channel as the manually operable means is moved towards one of said settable positions.

14. In a transmission device, driving and driven shafts, impeller and turbine wheels carried by the driving and driven shafts and forming a fluid circuit for the transmission of power, a plurality of vanes carried by one of said wheels and movable angularly from an open position to a position to substantially close said fluid circuit, means including a gear member to move said vanes angularly, forward and reverse driving means connected with the driven shaft, manually operable means having a neutral, a forward and a reverse position controlling the forward and reverse driving means, and means actuated by movement of the manually operable means from either the forward or reverse positions towards the neutral position to actuate said gear member to substantially close said channel and to actuate said lever to open said channel as the manually operable means is moved to either of the forward or reverse positions.

15. In a fluid transmission, impeller and turbine elements adapted to energize and receive energy from a fluid, speed ratio varying means associated with the fluid transmission, mechanism to actuate the speed ratio varying means, and manually operable means to actuate said mechanism and to interrupt the operation of the fluid transmission during an initial stage of the operation of the mechanism to actuate the speed varying means.

JOSEPH JANDASEK.